United States Patent [19]

Kramer, Sr.

[11] 4,305,790

[45] Dec. 15, 1981

[54] MULTIPLE EFFECT DISTILLATION METHOD AND APPARATUS

[76] Inventor: Edward F. Kramer, Sr., 14 Wildwood St., Bayou Jack Marina, New Iberia, La. 70560

[21] Appl. No.: 118,074

[22] Filed: Jan. 31, 1980

[51] Int. Cl.³ .............................................. B01D 3/06
[52] U.S. Cl. ........................................ 203/19; 203/23; 203/25; 203/75; 203/77; 203/78; 203/80; 203/82; 203/84; 203/DIG. 13
[58] Field of Search ................ 71/26; 159/2 R, 2 MS, 159/17 R, 17 P, 17 VS; 203/19, 21–23, 25, 27, 71, 73–75, 77, 78, 80–82, 84, DIG. 13; 202/174

[56] References Cited

U.S. PATENT DOCUMENTS 2,053,111 9/1936 Reich ................................. 202/174

*Primary Examiner*—Frank Sever
*Attorney, Agent, or Firm*—Harvey B. Jacobson

[57] ABSTRACT

The recovery of alcohol from fermentation liquors is accomplished by the evaporation of the liquor feed and simultaneous rectification of the volatile component. Evaporation of the liquor feed can be accomplished by a single flash evaporation or multiple effect evaporation combined with the flash evaporation in which the flash evaporator is one effect of the multiple effect evaporator. A concentrated alcohol component is recovered along with a concentrated residue useful as a fertilizer or animal feed supplement.

8 Claims, 2 Drawing Figures

MULTIPLE EFFECT DISTILLATION METHOD AND APPARATUS

BACKGROUND OF THE INVENTION

Field of the Invention

This invention relates to a method for distillation and concentration, and is particularly adapted to the recovery of the products obtained by the fermentation of carbohydrate materials, such as sugar cane, sorghum, corn, sugar beets, potatoes, various grains, malt, biomass and the like. When these materials are subjected to conventional fermentation processes, fermentation liquors containing valuable volatile and non-volatile compounds are obtained.

In order to recover the products of fermentation liquor, the liquor known as beer, wort or mash, herein referred to as beer, is subjected to simultaneous evaporation of the fermentation liquid and the rectification of the volatile product which contains lower alcohols such as ethanol. The non-volatile residue or slops or lees remaining contains valuable organic protein materials and inorganic minerals.

The present invention utilizes flash evaporation of the beer, with optional use of multiple effect evaporation, and recitification of the volatile component in one continuous operation to produce a strong concentrated alcohol product and maximum concentrated slops or lees. The valuable volatile and non-volatile products are recovered in maximum concentrations without the need of further recovery techniques and subsequent added expense.

DISCLOSURE STATEMENT

The recovery of alcohol and valuable slops from fermentation liquors is known and is the subject of U.S. Pat. Nos. 1,599,185, 1,930,869, and 2,010,929, issued to Reich. The above patents teach a combination of multiple effect evaporation with rectification of the alcohol-containing vapor and further teach the conventional use of vacuum in the evaporator to recover the alcohol and slop content of fermentation liquors. The liquor feed is introduced into the evaporator from a feed pipe placed above a baffle plate far above the liquid level in the evaporator. The feed pipe can be moved relative to the baffle plate enabling (a) gases dissolved in the incoming liquid to be expelled from it before it mixes with the body of liquid in the evaporator, (b) the bulk of the alcohol content of the incoming feed to be vaporized therefrom without boiling the liquid and before it mixes with the body of liquid in the evaporator, and (c) foaming to be largely avoided and any foam formed broken. The above patents do not teach flash evaporation of the fermentation liquor under high vacuum and partial rectification of the vapor in the evaporator as the present invention.

Other patents of interest teach combinations of flash evaporation and multiple effect evaporation of water but do not teach recovery of alcohol for fermentation liquors or the rectification of the formed vapor.

U.S. Pat. Nos. 2,908,618—Oct. 13, 1959—Bethon
U.S. Pat. Nos. 3,150,028—Sept. 22, 1964—Wennerberg
U.S. Pat. Nos. 3,285,834—Nov. 15, 1966—Guerrieri et al
U.S. Pat. Nos. 3,697,383—Oct. 10, 1972—Weaver
U.S. Pat. Nos. 3,830,704—Aug. 20, 1974—Frank
U.S. Pat. Nos. 3,941,663—Mar. 2, 1976—Steinbruchel.

SUMMARY OF THE INVENTION

The present invention provides a process and apparatus for the recovery of products associated with the fermentation of carbohydrate materials although in its broadest sense the invention relates to a process and apparatus to produce concentrated end products from certain binary or tertiary mixtures of substances such as ethanol-water, organic and inorganic acids-water, alkalies-water, and most water mixtures of constant boiling (azeotropes), having maximum or minimum boiling points regardless of source. The invention enables the recovery and use of energy related products obtained from renewable solar energy processes, such as photosynthesis, e.g., ethanol useful as a motor fuel additive (gasahol), valuable protein and mineral compounds useful as fertilizers or feed supplements.

The process of recovering highly concentrated fermentation products in accordance with the present invention involves the simultaneous evaporation of the fermentation liquid and rectification of the volatile products. The process combines flash evaporation of the fermentation liquor (beer) with optional use of multiple effect evaporation to economize on energy consumption, and partial rectification of the volatile product in the evaporator and then complete enrichment of the volatile product in a separate rectifier to produce a concentrated alcohol end product and a maximum concentrated non-volatile residual end product (slops, lees).

The apparatus for carrying out the recovery process, a combination of evaporators and distillation equipment, can be found and adapted from existing equipment located in raw sugar factories, beet factories and sugar refineries which in many instances remain idle because of seasonal operations.

In accordance with the present invention a beer feed containing 5%-10% or more by weight alcohol is heated, the heated feed introduced into an evaporator whereupon the feed is immediately flashed and the vapor rectified and enriched to produce a concentrated product of about 95%-99% alcohol. The non-volatile component from the evaporator is also recovered in concentrated form. The flash evaporation can be accomplished in a single effect, or the flash evaporation can be used as one effect of a multiple effect evaporator. In multiple effect operation, volatile product from the first evaporator units can be directly fed to the steam chest of the flash evaporator and the partially evaporated slop from the flash evaporator can be fed to the other evaporator units for further concentration as in conventional countercurrent operation, although parallel operation or a mixture of both operations can be utilized to provide continuous recovery of the alcohol and slops end product.

Accordingly, it is an object of the invention to produce concentrated end products from binary or tertiary mixtures at the minimum cost of capital inventment and energy usage.

Another object is to produce concentrated end products from liquors of fermented carbohydrate materials at minimum expense.

Another object is to recover energy related products from plants or biomass sources.

Still another object of the invention is to recover concentrated alcohol, protein, and mineral end products from fermentation liquors.

A further object is to recover concentrated end products from fermentation liquors by the simultaneous flash evaporation of the fermentation liquid and the rectification of the volatile product.

Yet another object of the invention is to recover concentrated end products from fermentation liquors by the simultaneous flash evaporation of the fermentation liquid with optional multiple effect evaporation, partial rectification of the volatile product in the flash evaporator and complete enrichment of the volatile product in a separate rectification stage.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Briefly stated, the present invention comprises subjecting fermentation liquors containing about 5%-10% by weight alcohol to simultaneous flash evaporation and rectification of the volatile alcoholic product to recover a concentrated (95%-99%) alcohol product and a concentrated non-volatile product which contains valuable protein and mineral compounds. In one embodiment for the recovery of the valuable end products, the flash evaporation comprises one unit of a multiple effect evaporation apparatus.

Figure 1:
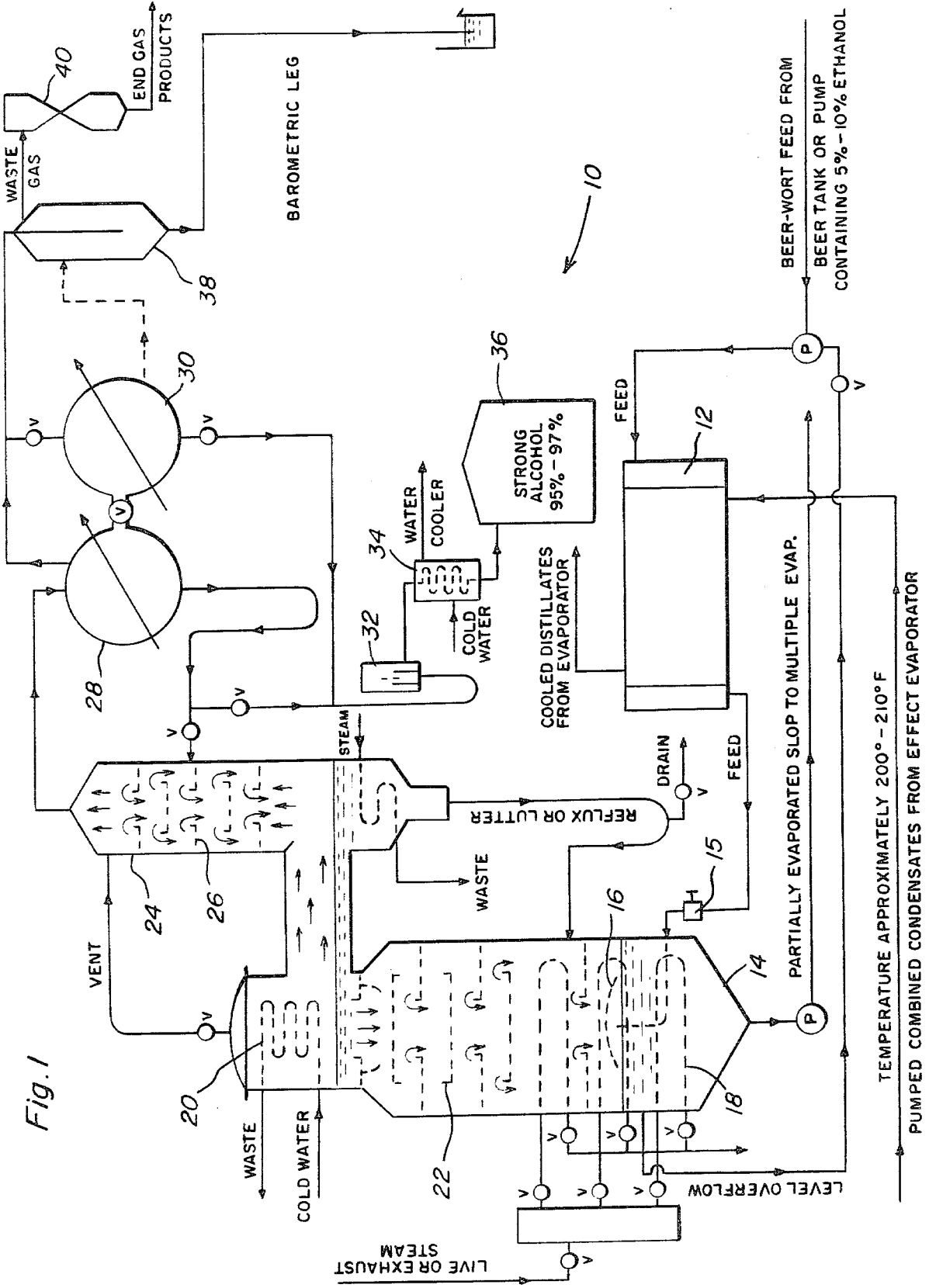
FIG. 1 is a schematic drawing and flow chart of the process and apparatus of the present invention in which single effect evaporation is utilized.
Figure 2:
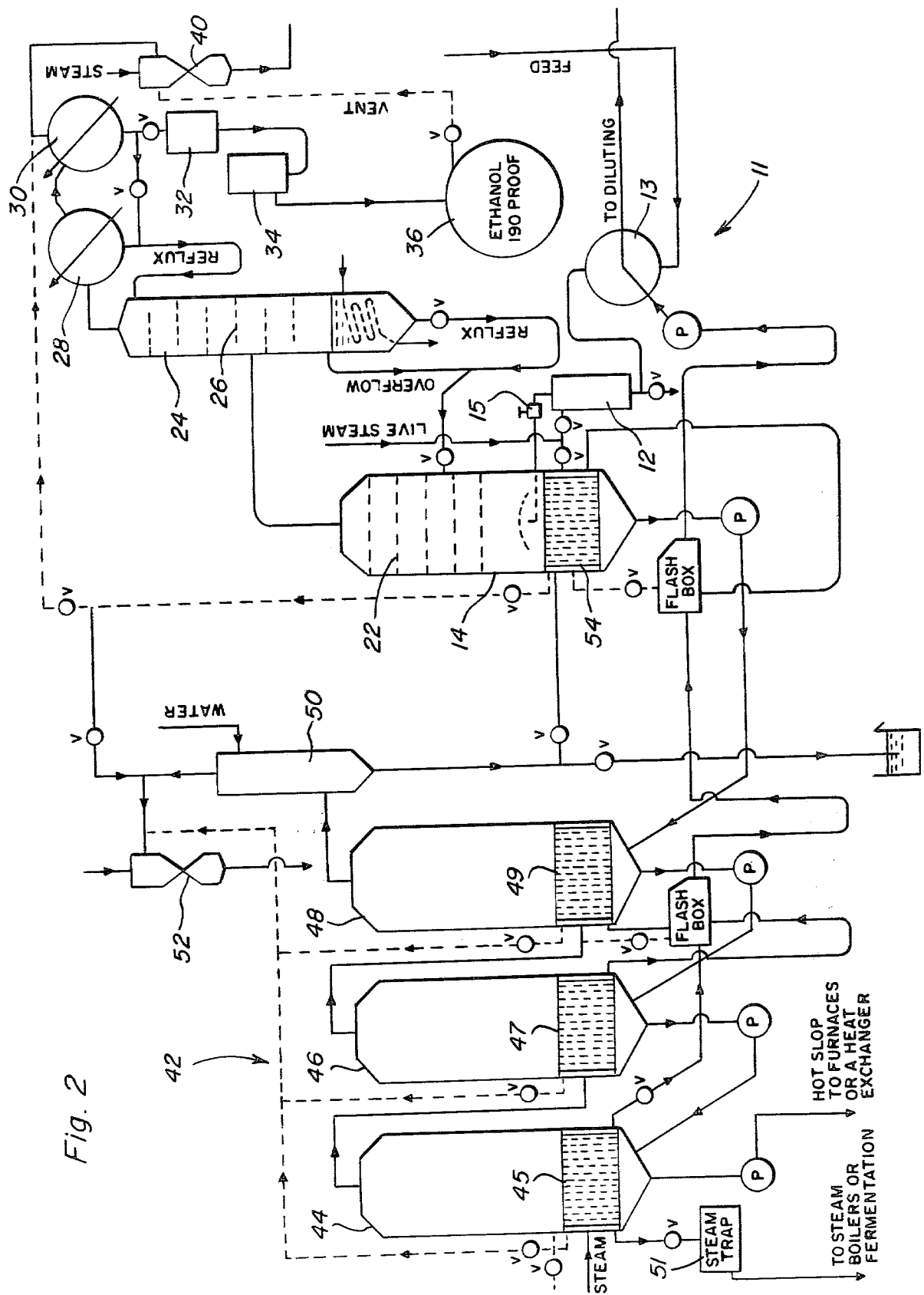
FIG. 2 is a schematic diagram and flow chart of the recovery system of the present invention showing multiple effect evaporation and distillation.

The recovery system 10 shown in FIG. 1 utilizes a combination of a single effect evaporator with conventional rectification and condensation equipment. The beer feed containing about 5%-10% of a lower alcohol such as ethanol is pumped to heater 12, which can operate as a heat exchanger, recovering heat from the formed slops of evaporator 14 or from the volatile product formed in evaporator 14 or even from the multiple effect evaporator as shown in FIG. 2. The beer is heated in heater 12 before entering evaporator 14, which is of any conventional type, such as a calandria pan, coil vacuum pan, etc. The temperature of the beer feed, controlled by thermostat 15, and the pressure inside evaporator 14, preferably a vacuum, are such that the heated feed upon entering the vapor space of evaporator 14 and deflected downward by curved plate 16 will immediately flash, the vapor formed being of a composition consistent with the vapor-liquid equilibrium of the azeotropic mixture formed at the particular pressure and temperature used. Liquid overflow from evaporator 14 can be returned to the feed for reheating along with a portion of the evaporated slops, if desired.

One type of evaporator which works well in recovery system 10 is a coil vacuum pan containing plates 22 shown in FIG. 1. Evaporator 14 as a coil vacuum pan includes steam coils 18 and cold water upper coils 20. Both sets of coils reduce foaming of the beer feed, steam coils 18 evaporating any gases dissolved in the fermentation liquid and cold water upper coils 20 condensing any foam which may be formed at the top of evaporator 14. Coils 18 are connected with a source of steam regulated by the valve shown and are used to further heat the beer feed entering evaporator 14. Cold water coils 20 along with perforated plates 22 form a rectifying portion of evaporator 14. A source of cold water fed into coils 20 condenses a portion of the volatile product formed during the flash evaporation of the beer, whereupon the condensed volatile product countercurrently contacts the upward moving vapor, thereby enriching the more volatile alcohol component. The evaporator 14 is shown containing five perforated plates, although the number of plates is not a critical feature of the invention. A portion of the enriched volatile product and condensed volatiles from coil 20 is passed to enricher 24, formed from a barometric condenser installed with perforated plates 26. Further rectification of the alcohol volatile product proceeds as the volatile condensate is heated, such as with steam in enricher 24. There are five perforated plates 26 shown in enricher 24, although like evaporator 14, any number which will produce a maximum concentrated alcohol product is sufficient. The type of plates 22 and 26 installed in evaporator 14 and enricher 24 are the conventional bubble, tunnel and perforated plates, although in some cases packings may be used depending on the nature of the material being processed. Condensate from enricher 24 may be refluxed to the rectifying portion of evaporator 14. The enriched alcoholic vapor from enricher 24 is condensed to liquid form in conventional dephlegmator 28 cooled by water or beer and condenser 30 which is water cooled. Dephlegmator 28 and condenser 30 are typically juice heaters. A portion of the enriched alcoholic condensate from dephlegmator 28 is refluxed to enricher 24 for further rectification and an end product portion from the condensing apparatus is passed to conventional test box 32, cooler 34, and then stored in tank or receptacle 36. The amount of reflux and end product drawn from the condensing apparatus being controlled by valves V. Volatiles which are not condensed in condensing apparatus 28 and 30, waste gases, such as aldehydes and organic acids, are passed to separator 38 whereupon condensate can be removed and if desired, recovered, and waste gases passed out through ejector 40. A vaccum pump can be substituted for ejector 40.

In FIG. 2, the recovery operation 11 is substantially the same as operation 10, as shown in FIG. 1, comprising heat exchanger 12 including preheater 13 thermostat 15, evaporator 14 containing a rectifying portion including perforated plates 22 for flash evaporation and partial rectification of the heated beer feed, enricher 24 to complete rectification, condensing apparatus dephlegmator 28 and condenser 30, test box 32, cooler 34 and storage 36 for the cooled liquid concentrated alcohol end product. Waste gases can be removed by ejector 40. Included in recovery operation 11 is multiple effect evaporator 42 comprising evaporation units 44, 46 and 48 with associated steam chests 45, 47 and 49, respectively, shown connected with barometric condenser 50 and waste gas ejector 52. By not using barometric condenser 50, vapor from evaporator unit 48 will pass to the steam chest 54 of evaporator 14 and thus recovery operation 11 will operate as a quadruple distillation. The multiple effect distillation is shown in FIG. 2 in countercurrent flow wherein vapor formed in evaporation unit 44 formed by live or exhaust steam is passed onto the steam chest of the next evaporation unit 46, and so on, so that the vapor formed in one effect is passed on to the steam chest of the next effect and condensate from the beer feed is passed from evaporator 14 to preceding evaporating unit 48, and so on, so that the condensate from one evaporator unit is passed on to the steam chest of the preceding unit. Instead of the countercurrent flow shown in FIG. 2, parallel flow can also be used or even a mixture of countercurrent and parallel flow. The concentrated slops can be recovered from evaporator unit 44 and used for irrigation or an animal feed supplement or a portion may even be used to heat the feed in heat exchangers 12 and/or 13. Flash boxes or steam trap 51 may be utilized to collect slops condensate before entering the heat exchangers. In both FIGS. 1 and 2, valves V are illustrated controlling flow of feed, vapor and condensate.

OPERATING CONDITIONS

The fermentation liquor feed generally will contain about 5%–10% by weight alcohol. The process of the present invention recovers a concentrated, about 95%–99% alcohol end product. The slops or lees are also recovered in concentrated form and will weigh about 1/5 to 1/4 of the weight of the beer feed after distillation is completed.

The distillation is operated continuously, withdrawing alcohol and slops end products at a constant concentration and quantity. The amount of end products withdrawn and refluxed can be varied depending upon the amount of fermentation liquor feed and end product concentration desired.

A beer feed of approximately 85° F. is heated in heat exchanger 12 to a temperature of about 180° F.–210° F. The temperature of the beer feed and pressure inside evaporator 14 are such that flash evaporation of the feed will occur upon entering the vapor space of evaporator 14. A vacuum inside the evaporator 14 is preferred, though positive pressures may be used so long as flash evaporation will occur. In the embodiment in which evaporator 14 is used as a single effect evaporator, a vacuum of 26 inches mercury is used throughout the recovery system 10, including evaporator 14, enricher 24, dephlegmator 28 and condenser 30. In the countercurrent multiple effect distillation shown in FIG. 2, recovery system 11, like single effect system 10, can use a vacuum, the amount of vacuum increasing with each distillation unit. While the amount of vacuum and degree of increase of vacuum for each evaporator unit will vary during operation, a preferred operation is as follows: The first unit 44, wherein evaporation of the volatile component is substantially complete, a small vacuum of about 3.5 inches mercury can be used. The vacuum may be increased in each of the next units of the multiple effect evaporator; unit 46, 4 inches mercury; unit 48, 15 inches mercury; and evaporator 14, 26 inches mercury. In countercurrent flow, the valve from evaporator 44 to steam trap 51 is closed and the valve to the flash box open for collection. In parallel flow, the valve to the flash box is closed and the one to steam trap 51 open for collection of condensate. In the enricher and condensing devices, a vacuum of 26 inches mercury may be used as in the single effect system 10. The multiple effect distillation system with vacuum provides the preferred means of obtaining maximum yields of the alcohol component. The recovery system can be either manually or automatically controlled to provide a maximum yield of the end product.

The present invention enables the recovery of valuable compounds from fermentation liquors at minimal capital investment and energy use and can be used to recover volatile components from any biological source.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A process for the continuous evaporation of alcohol-containing fermented liquors for the recovery of alcohol and the production of slop containing solid matter in high concentration, comprising heating the liquor, introducing the heated liquor into an evaporator, said evaporator having an inside pressure less than atmospheric and temperature such that upon entering the evaporator volatile components of said liquor immediately flash into an alcohol-containing vapor, said evaporator being provided with an upper rectifying section formed of vertically spaced perforated plates positioned above the point at which said liquor enters the evaporator, partially rectifying said alcohol-containing vapor in said upper rectifying section to form an enriched alcoholic vapor, providing an enricher communicating with said upper rectifying section of said evaporator, said enricher containing perforated plates, passing a portion of said enriched alcoholic vapor directly from said upper rectifying section to said enricher at a position below said perforated plates and completing rectification of the alcoholic vapor in said enricher to produce a concentrated alcohol vapor and condensing said concentrated alcohol vapor to liquid alcohol.

2. The process of claim 1 wherein said rectifying section of the evaporator further comprises a cooling section above said plates and wherein said partial rectification comprises condensing a portion of the enriched alcoholic vapor by said cooling section and countercurrently contacting said condensed vapor with the upward moving alcohol-containing vapor formed during said flash evaporation.

3. The process of claim 2 comprising forming condensate of said alcoholic vapor in said enricher and refluxing a portion of said condensate to the rectifying section of said evaporator.

4. The process of claim 3 wherein said evaporator is a unit of a multiple effect evaporator and said slop is recovered from alcohol-containing residue of the fermentation liquor formed during said flash evaporation, said process comprising passing said residue from said evaporator to a second unit of said multiple effect evaporator, and evaporating a portion of alcohol from said residue to form an alcohol-containing vapor and introducing said alcohol-containing vapor from said second evaporator unit to said evaporator to heat said evaporator and beer feed entering therein and recovering a more concentrated residue from said second evaporator unit of said multiple effect evaporator.

5. The process of claim 4 wherein said second evaporator unit operates at a vacuum smaller than the vacuum in said evaporator.

6. The process of claim 5 wherein said enricher operates under a vacuum and said vacuum of said evaporator and said enricher is 26 inches mercury.

7. The process of claim 6 wherein said multiple effect evaporator is a quadruple wherein residue formed in one evaporator unit is passed to the preceding unit and alcoholic vapor formed in one evaporator unit is passed to the next higher unit.

8. The process of claim 7 wherein said evaporator contains a feed pipe and a curved plate spaced above said pipe, said process comprises introducing said liquor into the evaporator through said pipe and deflecting said feed downward by contact with said curved plate immediately before flash evaporation.

* * * * *